Figure 1:
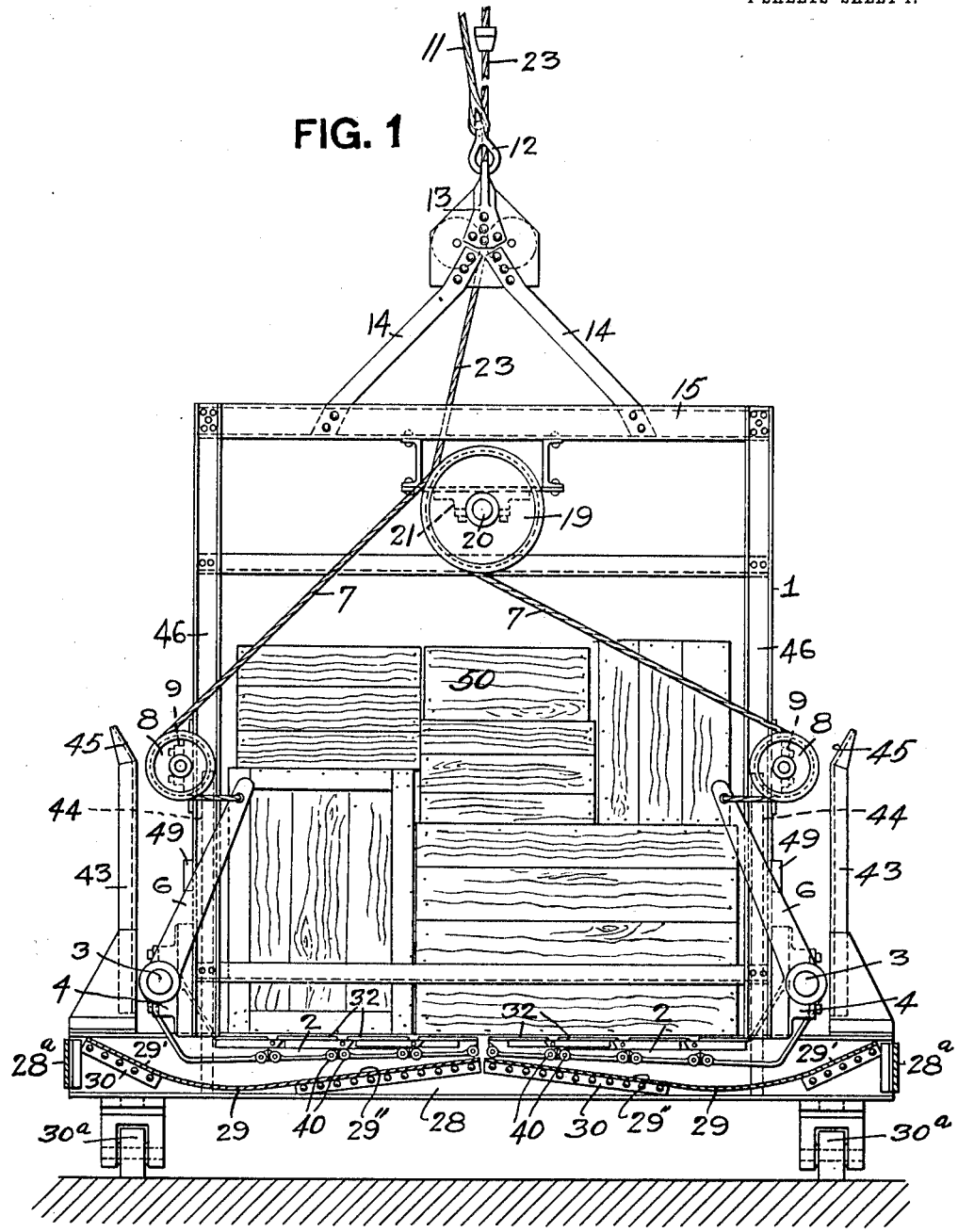

W. B. MILLER.
MERCHANDISE CARRIER.
APPLICATION FILED JAN. 23, 1911.

1,022,104.

Patented Apr. 2, 1912.
4 SHEETS—SHEET 4.

WITNESSES.
J. R. Keller
John F. Will

INVENTOR
William Boyd Miller
By Kay & Totten
attys

UNITED STATES PATENT OFFICE.

WILLIAM BOYD MILLER, OF PITTSBURGH, PENNSYLVANIA.

MERCHANDISE-CARRIER.

1,022,104.  Specification of Letters Patent.  Patented Apr. 2, 1912.

Application filed January 23, 1911. Serial No. 604,210.

*To all whom it may concern:*

Be it known that I, WILLIAM BOYD MILLER, a resident of Pittsburgh, in the county of Allegheny and State of Pennsylvania, have invented a new and useful Improvement in Merchandise-Carriers; and I do hereby declare the following to be a full, clear, and exact description thereof.

My invention relates to a loading and unloading device for use in picking up a large number of boxes or packages of merchandise at one time and unloading them together in the desired place. Its object is to provide a simple and efficient device of this nature which can be readily manipulated, saving a great amount of labor, especially in unloading the articles at the desired point.

My invention is applicable to a number of loading, unloading and conveying purposes where it is necessary to embrace and elevate, lower or convey articles which must not be mutilated, jarred or broken either in embracing or releasing. Thus the device can be used for raising, lowering or conveying a number of packages in bulk from one floor or section of floor of a warehouse or store to another; or for picking up such articles from a wharf or dock and delivering them into the hold of a ship, or vice versa; or for quickly loading an express or freight car with packages from the station platform, or for other like uses which will readily suggest themselves to persons interested in decreasing the labor caused in such operations, or decreasing the time necessary in the same.

My invention is to be distinguished from such devices as grab buckets or all machines in which, while the burden is embraced, picked up and discharged in bulk, the engaging means is necessarily forced through the burden, such as coal, ore or the like, this plan being of course impossible in the case of packages containing fragile articles of merchandise.

To these ends my invention contemplates, generally stated, a merchandise carrier or loader and unloader comprising means such as a platform for carrying the merchandise in suspended position in combination with pivoted arms adapted to carry the merchandise, means for pivotally inserting said arms beneath the merchandise and means for raising and carrying the arms with their burden.

An essential and important feature of my invention consists necessarily in the construction of the carrying arm which must enter beneath the merchandise without mutilating the same. In the preferred embodiment I provide a series of such arms which are in the form of linked cantalivers pivoted to a carrier and controlled by suitable guides through which the links are movable to enter under the merchandise, and actuated by suitable manipulating means such as a line and pulley device connecting with a shaft on which the cantaliver arms are pivoted.

Figure 2:
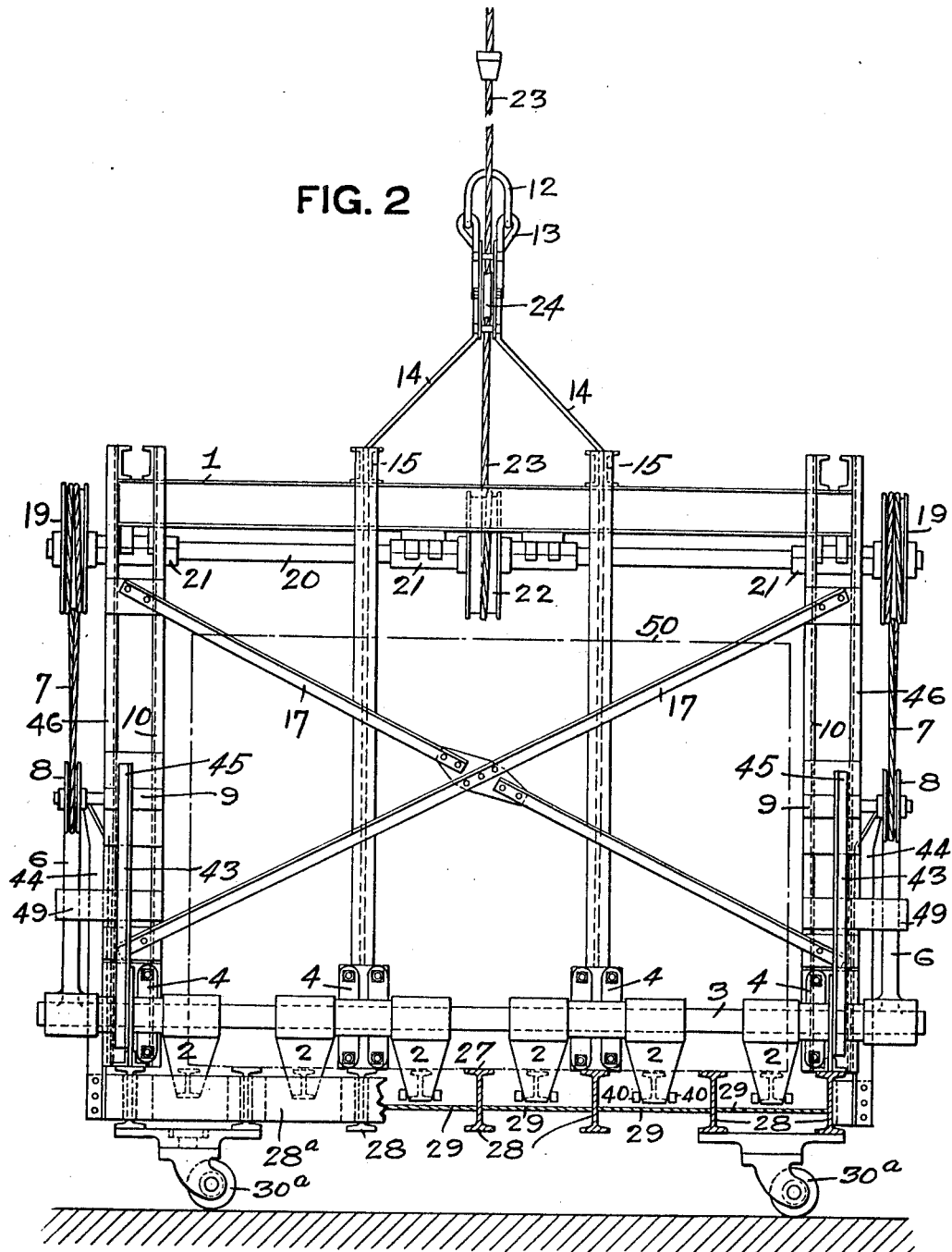
Figure 3:
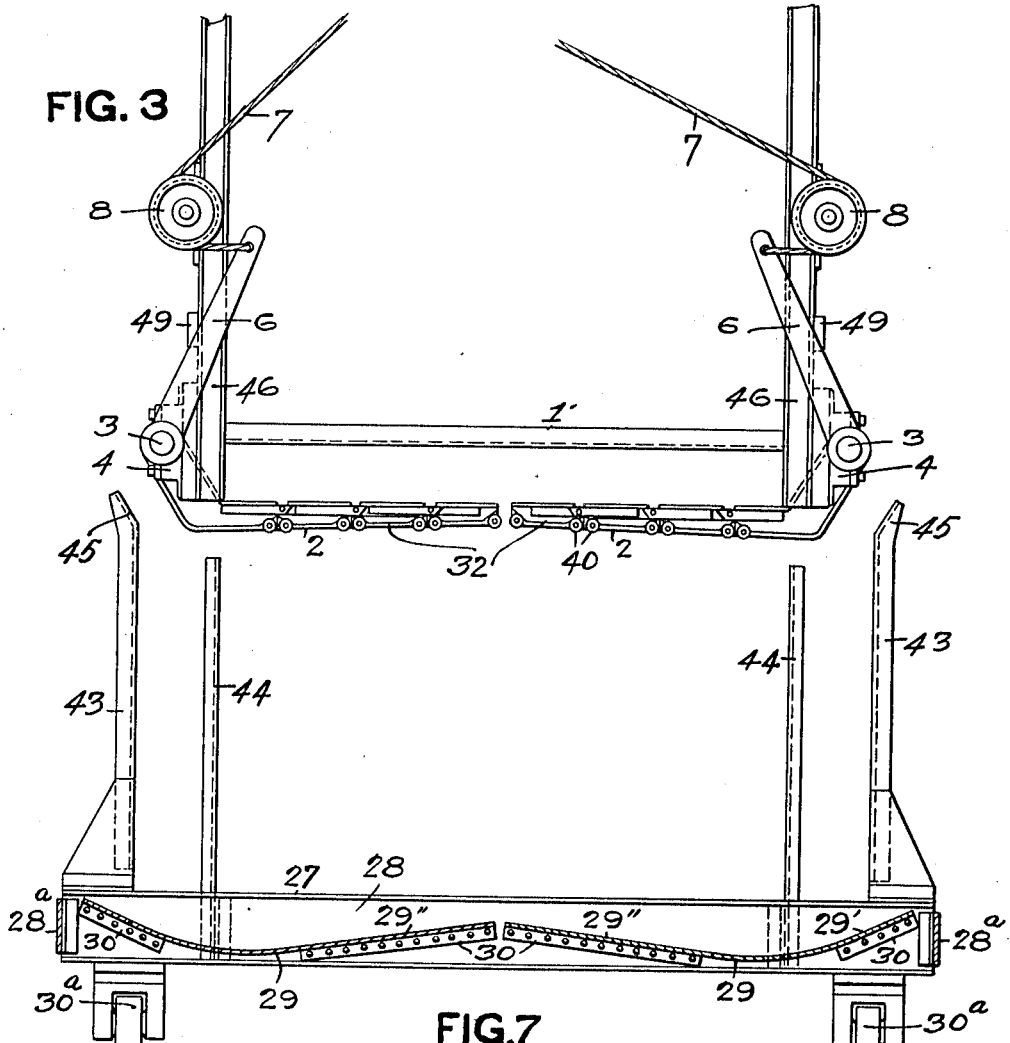
Figure 4:
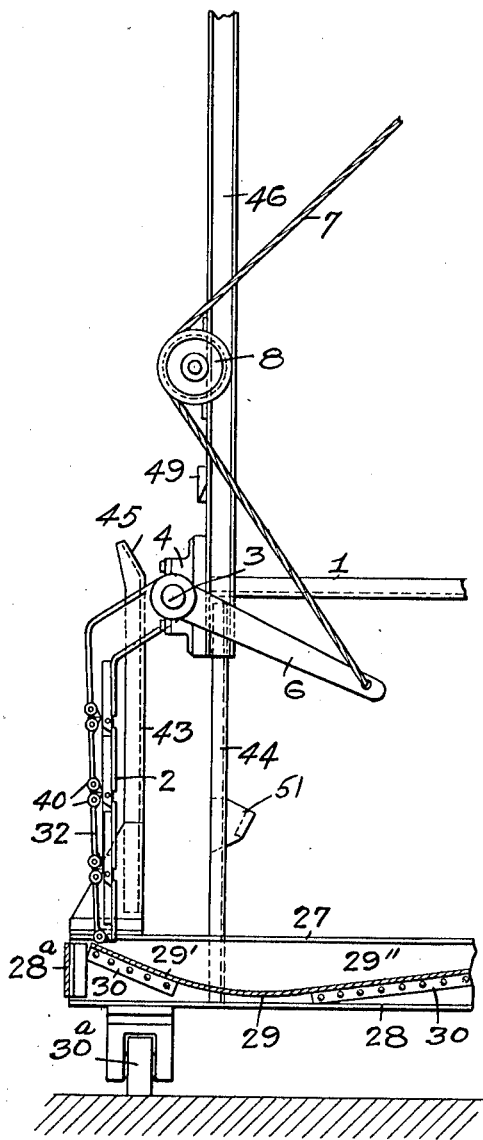
Figure 5:
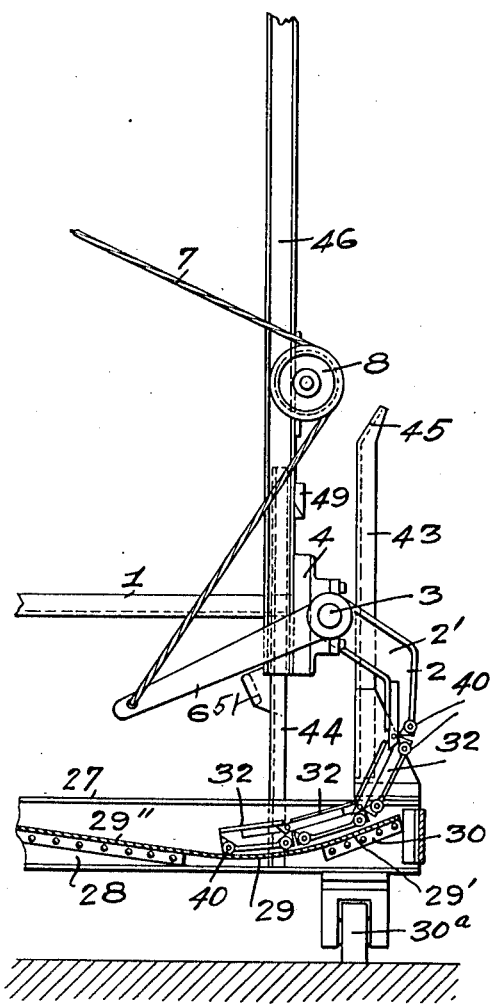

In the accompanying drawings illustrating my invention Figure 1 is an end view illustrating the complete device in position for raising or unloading the burden and Fig. 2 is a side view of the same in the same position. Fig. 3 is a diagrammatic end view illustrating the merchandise suspending and raising device in separated position. Fig. 4 is a detail end view illustrating the cantaliver arm in the position assumed just before entering the guide of the merchandise support to embrace the merchandise; and Fig. 5 is a like view illustrating the same mechanism in partially entered position. Fig. 6 is an enlarged detail view of the link cantaliver illustrated in Figs. 1 to 5. Fig. 7 is a vertical section on the line 7—7 Fig. 6. Fig. 8 is a detail horizontal section on the line 8—8 Fig. 6, and Fig. 9 is a detail perspective view of one of the links in the cantaliver.

As illustrated in Figs. 1 to 5 I employ preferably the carrying frame 1 on which the cantaliver arms 2 are pivotally mounted, being fulcrumed on the rock shafts 3 carried in bearings 4 on opposite sides of the frame 1. Each rock shaft 3 is provided with the lever arms 6 preferably arranged in pairs at opposite ends of the rock shaft and connected to the line, chain or wire rope 7 running around the sheaves 8, which are mounted in corresponding pairs in bearings 9 on the end members 10 of the frame 1.

The frame 1 is suspended from a suitable crane or like carrying device (not illustrated) by the line 11 connected thereto in any suitable manner, such as by the clevis 12, hook 13 and bracket arms 14 attached to the top cross members 15 of the frame 1. The carrier frame 1 is also preferably provided with the side tie rods 17 to complete and brace the frame. Each pair of lines 7 at the end of the frame extends upwardly from a sheave 8 to encircle the sheave or pulley 19 which is mounted on a rock shaft 20 carried in suitable bearings 21 by the frame 1 and having the centrally arranged pulley 22 actuated by the controlling line 23 guided preferably by the sheaves 24 and operated from a crane or derrick in a similar manner to the line 11, as is well understood in the art.

It is obvious that any suitable carrying or transferring device may be employed depending on the particular use to which the loading and unloading device of my invention is applied, and also that the particular construction of frame and the particular means employed for controlling and actuating the pivoted arms or cantalivers may be varied without departing from the scope of my invention.

In order that the cantaliver arms 2 may enter beneath articles of merchandise, it is necessary that the merchandise be supported or suspended at a space from the ground or floor. The preferred form of suspending means comprises a platform 27 consisting essentially of a frame work formed conveniently by the I-beam 28 and side members 28$^a$ preferably movably supported upon the rollers 30, as illustrated. Between the I-beams 28 are carried the cantaliver guides 29 conveniently formed of bent sheet metal provided with flanges 30 riveted or bolted to the I-beams 28. A pair of symmetrically positioned guides 29 is provided between each pair of I-beams. Each guide of said pair has a double curve, the portion 29′ sloping downwardly from the outside in the direction of entrance of the linked cantalivers and the portion 29″ being inclined upwardly toward the meeting point of the guides at the middle of the I-beams. The more abrupt downward incline is in the portion 29′ at the entrance end of the guideway 29, and the less abrupt incline in the portion 29″ at the inner end, the said portion 29″ acting as a downward incline to aid the easy outward travel of the links 32 when the pivoted arms are withdrawn from the guides 29.

Each cantaliver arm 2 consists of a number of links 32 pivoted to each other or to the main pivoted arm 2′ of the cantaliver arm 2 by the pins 33, as illustrated clearly in Figs. 6 to 9. The links 32 as well as the arm 2′ are constructed preferably of I-beam shape, having the upper flange 34, the web 35 and the lower flange 36 terminating in the shoulder 37 at each end of the link 32, as illustrated clearly in Figs. 6 to 9. Fastened to the links 32 and the arm 2′ by the rivets 37 are the pivot-bars 38, each bar 38 having the portion 38′ extending beyond the link proper and carrying the pivot pin 33 which also extends through the hole 42 in the web 35 of the adjoining link. The reinforcing filler strips 39 are fastened by the rivets 37 between the pivot-bars 38 and the web 35 of each link 32 extending substantially the length of the link and bracing the pivot-joints between the links, the pivot pins 33 extending through both the pivot-bars 38 and the filler strips 39. The links 32 are therefore pivotally movable relative to each other, their pivotal movement below the horizontal in the carrying position of the arms 2 being prevented however by the abutting shoulders 37 on the links. The carrying arm or lever 2 is thus a true cantaliver, and in my preferred construction is capable of carrying great weights, as it is necessary to shear the pivots 33 before it can be broken or deflected from a substantially straight line position. At each end of each link 32 and at the forward end of the arm 2′, I provide rollers 40 mounted on pins 41 journaled in the shoulders 37 so arranged as not to interfere with the shoulders. These rollers 40 perform an important function in the operation of the device.

Assuming that the merchandise, indicated at 50, has been piled by hand or other suitable means upon the beams 28 of the suspending platform, and that it is desired to pick up the packages and boxes of the pile, the carrying device represented by the frame 1 carrying the cantaliver arms 2 is lowered into position above the platform support 1, the cantalivers 2 being allowed to assume the position illustrated in Fig. 4 by the manipulation of the controlling line 25 and consequent relaxation of the rope 7. The object being to insure that each cantaliver 2 will meet the downwardly sloping portion 29′ of the corresponding guide 29, I preferably provide the guiding arms 43 and 44 on the platform support 27 and the channel guides 46 in the frame 1. The outer guide arms 43 are provided with the funnel ends 45 adapted to abut against the rock shaft 3 or other sidewise projecting portion of the carrying device and guide the carrying frame 1 so that the guiding channel members 46 will register with and receive the guiding arms 44, as the carrying device is lowered into merchandise embracing position. The platform support 27 may also be twisted or moved slightly on the rollers 30 in order to facilitate this engagement of the arms 44 and guides 45, although it is apparent that other and equivalent means may be employed to facilitate the register of the cantalivers 2 with the guides 29. As soon as the end link 32 of the cantaliver 2 meets the portion 29′ of the guides 29, it is pivotally deflected, the anti-friction rollers 40 running along the guide as illustrated in Fig. 5, and the cantaliver gradually but readily entering the guideway until it has assumed a horizontal position aided by the proper manipulation of the rope 7. As soon as the ropes 7 are drawn taut, so that the lever arms 6 abut against the stops 49 on the frame 1, the merchandise may be raised by simply lifting the said frame by means of the carrying lines 11 and 23. In unloading the merchandise at the desired point, a suspending support like the platform support 27, illustrated, is preferably employed, the carrying cantalivers 2 being lowered in a manner similar to that above described, the guideways 29, however, not coming into play in the lowering operation. The linked cantaliver arms 2 are readily removed from beneath the merchandise by removing the tension from the controlling rope 7 and raising the carrying frame 1, the cantalivers leaving the guides 29 in a manner similar to that illustrated in Fig. 5.

While the cantaliver arms 2 may, in the loading operation, be manipulated simply by the controlling lines 23 and 7, I prefer to provide automatic means for rotating the arms 2 about the rock-shafts 3. To this end I employ the dogs 51 on the guide rods 44. As the carrying frame 1 is lowered from the position illustrated in Fig. 4 to that of Fig. 5 the rollers 40 of the forward links 32 of each cantaliver arm 2 engage with and slide along the downwardly sloping portion 29' of each guide 29. As the links 32 are supported by the guide 29 the arm 6 will tend by its weight to prevent the rotation of the arm 2 about the shaft 3 until the said arm 6 engages the dog 51, as illustrated in Fig. 5. Further lowering of the carrying frame 1 to the position of Fig. 1 results in the raising of the arms 6 and consequent further inward motion of the links 32 along the upwardly sloping portions 29'' of the guides 29 until the arms 6 approach the stops 49. This means of operating the cantaliver arms 2 has great advantages where the operator is at a distance or out of sight of the loading device. The lines 7 may thus be drawn taut after the frame 1 is completely lowered, or the lines 7 may be gradually drawn by the line 23 acting in conjunction with the dogs 51 upon the lever arms 6.

What I claim is:

1. In a device of the character described, the combination with a portable carrier including oppositely disposed and pivotally mounted arms, and means for manipulating the same, of a support for merchandise provided with means for directing said arms into merchandise carrying position.

2. In devices of the character specified, the combination of a plurality of pivotally movable cantalivers and means for manipulating the same, with a support adapted to hold merchandise in suspended position and provided with means for guiding said cantalivers into position beneath said merchandise.

3. In devices of the character specified, the combination of a plurality of cantalivers each having a plurality of pivotally movable links, means for pivotally carrying and means for manipulating said cantalivers, with a merchandise support provided with means for guiding said pivoted links beneath said merchandise and adapted to allow the free removal of said cantalivers while maintained in horizontal carrying position.

4. In devices of the character specified, the combination of a plurality of oppositely arranged cantalivers, each having a plurality of pivoted links arranged to be limited in their outward pivoting, means for pivotally carrying said cantalivers and means for manipulating the same, with a platform support provided with curved guideways adapted to receive said cantaliver links and guide the same into carrying and extending position beneath the merchandise.

5. In devices of the character specified, the combination of a plurality of oppositely arranged cantaliver arms, each having a plurality of pivoted links arranged to be limited in their downward pivoting, means for pivotally carrying said cantalivers and means for manipulating the same, with a platform support having cross members adapted to hold the merchandise in suspended position and open guides between the same arranged to receive said cantaliver links and to allow for the vertical removal of said cantalivers carrying the merchandise.

6. In devices of the character specified, the combination of a portably carried frame provided with a plurality of oppositely disposed cantaliver arms pivoted thereto, rock shafts carrying said arms, and with suitable sheaves and lines connected to said shafts for manipulating the cantalivers, with a platform support adapted to hold merchandise in suspended position and provided with guiding means to receive said supporting frame and arranged to allow the engagement of said arms below the merchandise and their vertical removal when the frame is raised.

7. In devices of the character specified, the combination of a portable carrying frame provided with pivoted arms each having a series of pivoted links provided with means for limiting their downward pivoting below a given position and forming collectively a carrying cantaliver, and means for manipulating said arms, with a supporting platform adapted to support merchandise in suspended position and to permit the entrance of the aforesaid arms beneath the same, said carrying frame and said platform provided with mutually registerable arms and guides, substantially as described.

8. In devices of the character specified, the combination of a portable carrying frame provided with pivoted arms each having a series of pivoted links provided with means for limiting the downward pivoting below a given position and forming collectively a carrying cantaliver, and means for manipulating said arms, with a platform adapted to support merchandise in suspended position provided with guides adapted to receive said cantaliver links and direct the same into carrying position below the merchandise, said carrying frame and platform being mutually provided with guiding arms and channels and said platform having guiding arms adapted to insure the register of said arms and channels and thereby guide the cantaliver links into position for engagement by their guides.

9. In devices of the character specified, the combination of a support for merchandise in suspended position provided with guideways, with a plurality of pivoted arms, and means for pivotally carrying and manipulating the same, each arm having a plurality of links pivoted to each other, provided at their lower end portions with shoulders adapted to mutually abut, and with rollers adapted to run in said guideways when the pivoted arms are lowered.

10. In devices of the character specified, the combination of a support adapted to hold merchandise in suspended position and having a plurality of guides adapted to receive pivoted links, with a portable carrier, and a plurality of arms pivoted thereto, each arm having a plurality of links, each link having a longitudinal web and the adjoining link having extensions bracing said webs and a pivot journaled in said web and extensions, the links being provided with abutting shoulders arranged below said pivot and with rollers journaled in said shoulders, substantially as described.

11. In devices of the character specified, the combination of a portable carrier, a plurality of arms pivoted thereto and means for manipulating said arms, each arm having a plurality of pivoted links provided with shoulders in their lower abutting portions and with rollers arranged at both of their lower ends, with a supporting platform provided with means for guiding said frame into registering position and with guides of curved form and double incline arranged to receive the merchandise.

12. In devices of the character specified, the combination of a carrier having a plurality of pivotally movable carrying arms, with a support adapted to hold merchandise in suspended position and provided with permanent means for engaging and pivotally moving said arms to position beneath the merchandise.

13. In devices of the character specified, the combination with a carrying frame and a carrying arm pivoted thereto, of a supporting platform adapted to hold merchandise in suspended position, having a guiding arm adapted to guide said frame as it is lowered to said support and provided with means for engaging and pivotally moving said arm beneath the merchandise.

14. In devices of the character specified, the combination with a carrying frame and cantaliver arms pivoted thereto and each comprising a plurality of pivoted links, of a support adapted to hold merchandise in suspended position and provided with guides adapted to receive said cantaliver links of the arms and with means for automatically moving the arms into position beneath the merchandise when the arms are lowered to the support.

15. In devices of the character specified, the combination with a carrying frame, cantaliver arms pivoted thereto and each comprising a plurality of pivoted links, lever arms controlling said cantaliver arms and lines adapted to manipulate said arms, of a supporting platform adapted to hold merchandise in suspended position having guides adapted to receive said links when lowered into registering position and dogs adapted to engage and rotate said lever arms, substantially as described.

16. In devices of the character specified, the combination of a movable carrier provided with movably mounted arms, of a support adapted to hold merchandise in suspended position and to receive said arms beneath the merchandise, and provided permanently with means for actuating said arms to such position when the carrier is lowered to the support.

17. In devices of the character specified, the combination of a portable carrier provided with movable arms adapted to embrace merchandise and with controlling connections adapted to actuate said arms into embracing position, of a support arranged to hold merchandise in suspended position and having permanent means coöperating with said connections to automatically actuate said movable arms into position beneath said merchandise when the carrier is lowered to the support.

18. In devices of the character specified, the combination with a carrier including a movable cantaliver arm comprising pivotally connected links, and means for manipulating said arms, of engaging means for directing said arm into merchandise engaging position.

19. In devices of the character specified, the combination with a portable carrying frame having side members, and a substantially open bottom and thereby adapted to be moved to load confining position, movable arms pivotally mounted on said frame each comprising a plurality of pivotally movable links, and means for moving said arms, of a support adapted to hold the load in suspended position and provided with guiding means to direct said links beneath the load.

20. In devices of the character specified, the combination with a portable carrier, a plurality of arms pivoted thereto and means for manipulating said arms, of a supporting platform adapted to load merchandise in suspended position and having guides of curved form arranged to receive said arms and direct them beneath the merchandise.

21. In devices of the character specified, the combination with a portable carrier, arms pivoted thereto each comprising a plurality of mutually pivoted links and means for manipulating said arms, of means for holding merchandise in suspended position provided with guides for receiving said arms and directing them beneath the merchandise, each of said guides having oppositely inclined portions, the portion at the entrance end of each guide having a more abrupt downward incline than the portion at the interior end.

In testimony whereof, I the said WILLIAM BOYD MILLER have hereunto set my hand.

WILLIAM BOYD MILLER.

Witnesses:
    WM. A. STEINMEYER,
    JOHN F. WILL.

Copies of this patent may be obtained for five cents each, by addressing the "Commissioner of Patents, Washington, D. C."